United States Patent [19]
Ramsey, Jr. et al.

[11] Patent Number: 4,992,658
[45] Date of Patent: Feb. 12, 1991

[54] ELECTRET ION CHAMBER FOR RADON MONITORING

[75] Inventors: Robert W. Ramsey, Jr., Damascus; Payasada Kotrappa, Frederick, both of Md.

[73] Assignee: Rad Elec Inc., Frederick, Md.

[21] Appl. No.: 409,695

[22] Filed: Sep. 20, 1989

[51] Int. Cl.$^5$ .............................................. G01T 1/02
[52] U.S. Cl. .................................. 250/253; 250/255; 250/336.1
[58] Field of Search ..................... 250/253, 255, 336.1

[56] References Cited

U.S. PATENT DOCUMENTS 4,853,536  8/1989  Dempsey et al. ................. 250/253

FOREIGN PATENT DOCUMENTS 237721  7/1986  German Democratic Rep. ................................. 250/253

Primary Examiner—Janice A. Howell
Assistant Examiner—Richard Hanig
Attorney, Agent, or Firm—Cushman, Darby & Cushman

[57] ABSTRACT

An electret ion chamber for monitoring radon comprises a housing having an electret holder and a cover. The cover is attached to a plunger which closes over the electret when the cover is in place and is removed from the electret when the cover is opened. The plunger effectively turns "on" and "off" the radon monitor with the opening and closing of the cap. In very short term and very long term radon monitors, this turn on and off feature is not needed.

18 Claims, 4 Drawing Sheets

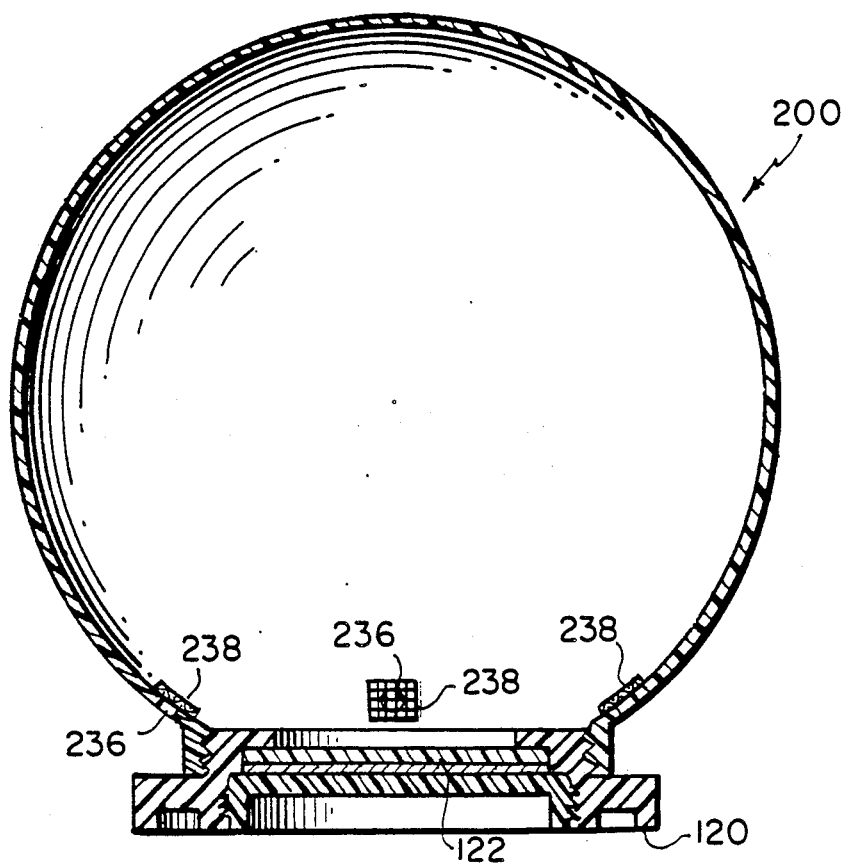
F I G. 4
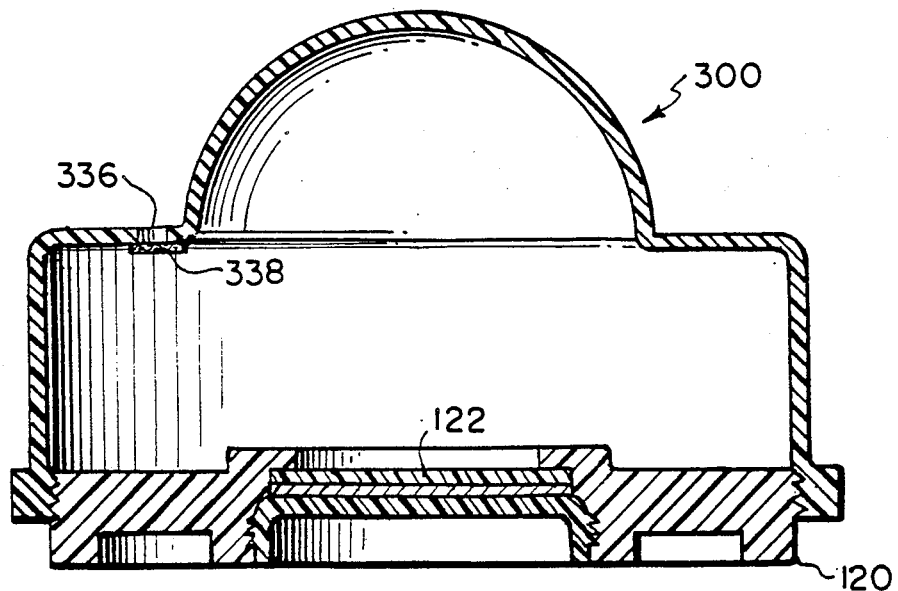
F I G. 5

ELECTRET ION CHAMBER FOR RADON MONITORING

BACKGROUND OF THE INVENTION

This invention relates to an improved apparatus for the detection of radon gas using an electret detector.

A known technique in the field of radon gas detection which has been found to be highly effective is the method and apparatus for detecting radon disclosed in U.S. Pat. No. 4,853,536 to Dempsey et al. for "An Ionization Chamber for Monitoring Radioactive Gas", the disclosure of which is hereby incorporated by reference. Briefly, the technique employs a small enclosed chamber with an electrostatically charged electret attached to the inner chamber wall. A filtered hole in the chamber permits radon or other radioactive gas to enter by diffusion. Positive or negative ions (depending upon the polarity of the electret charge) formed in the chamber air by decay of the radioactive gas move to and collect on the electret surface by virtue of its electrostatic attraction to ions of opposite polarity. These ions accumulate and cause a measurable reduction in the surface voltage of the electret and such a reduction is proportional to the time integrated concentration of the radioactive gas in the chamber. The electret surface voltage reduction value is used to calculate the average concentration of the radioactive gas during the exposure period. The electret thickness and chamber volume can both be increased to increase the sensitivity of the invention to radioactive gases such as radon, tritium or carbon-14 dioxide or other such radioactive gases.

Typically, this radon measuring technique is carried out by placing one or more chambers, each containing an electret detector, in locations to be monitored such as a dwelling and permitting the detectors to remain at the monitored site for a preselected period of time such as several days. After exposure, the chambers are opened and the electret surface voltage is measured to determine its reduction over the length of time monitored. The thus obtained voltage reduction is used to determine the average radon concentration at the monitored site.

While various types of electret ion chambers have been used for measuring ions in the air most tend to be bulky and difficult to use. The above-referenced radon monitor employed a chamber having a cup-like shape and further discloses a method of reducing the volume adjacent the electret when the radon monitor is not in use. With the need to measure radon concentration in dwellings and in the workplace environment, there arose a need for an easy-to-use device employing the electret detector method for radon monitoring. Such a device would be able to be turned on and off at the monitoring site from outside the device to permit accurate timed exposures without the necessity of immediately measuring the electret surface voltage before and after a test. Additionally the device would allow easy insertion and removal of the electret for surface voltage measurements.

SUMMARY OF THE INVENTION

The present invention is an electret ion chamber for radon monitoring having the features of low cost, accurate measurement and ease of operation.

To measure radon, an electret is fixed inside a housing made of conductive plastic. An electret cover is raised to expose the charged surface of the electret. Environmental radon diffuses through small filtered holes in the top of the housing. While the radon decays, the radiations generate ions in the air inside of the housing which knock electrons off the molecules of air. The electret charged with a positive polarity attracts negative ions (electrons) to its surface. Every ion that reaches the electret surface discharges it a small amount. Measurement of the surface voltage of the electret before and after exposure to radon gives a measurement of the concentration of radon during exposure.

The electret to be exposed is included in an electret holder which is threadedly attached to the housing to form a bottom closure of the housing. A cover is adjusted to fit over the housing. This cover is urged and maintained in an open position by a spring. Attached to the cover is a plunger which reduces the volume of air adjacent to the electret to near zero. Air enters through small filtered holes in the neck of the housing. The filters prevent particles and ions from outside of the chamber from entering the chamber and the small size of the holes reduces the thoron from entry into the chamber by more than 90%.

The housing provides a low-cost field readable radon monitor of high accuracy. Flexible exposure times are easily obtained by timing the opening and closing of the housing cover.

BRIEF DESCRIPTION OF THE DRAWINGS

FIG. 4 is a sectional view of an alternative preferred embodiment; and

FIG. 5 is a sectional view of another alternative preferred embodiment of the present invention.

DETAILED DESCRIPTION OF THE PREFERRED EMBODIMENTS

Figure 1:
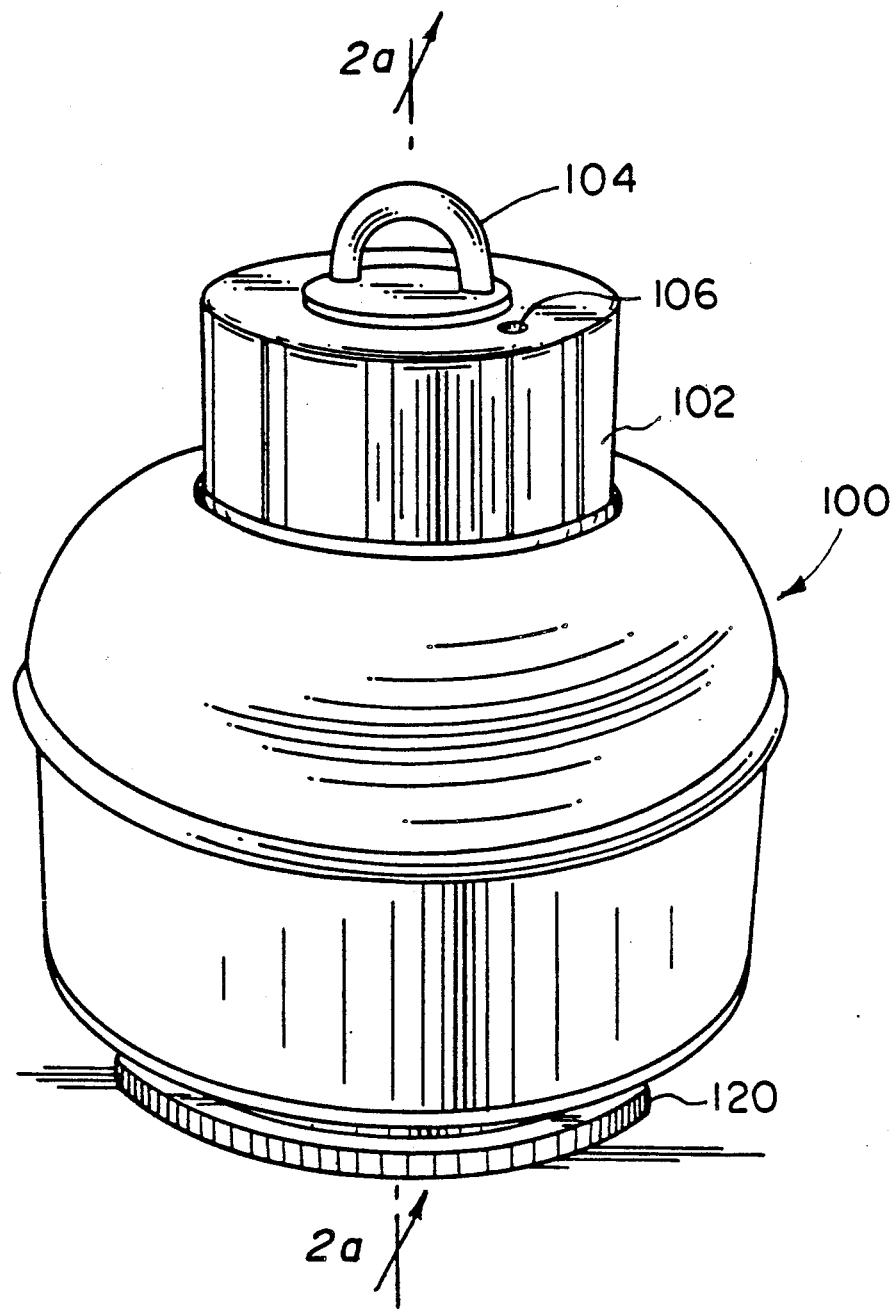
FIG. 1 is a perspective view of a preferred embodiment of the invention.

FIG. 1 illustrates in a perspective view a preferred embodiment of an ionization chamber. A housing 100 is made from a conductive plastic and has a cap 102 having a handle 104 which can be useful for hanging the chamber in a location to monitor radon. A hole 106 in cap 102 provides a vent to the inside of the housing to prevent condensation or pressure build-up within the housing. An electret holder 120 is threadedly attached to the body of the housing forming the lower portion of the chamber.

Figure 2A:
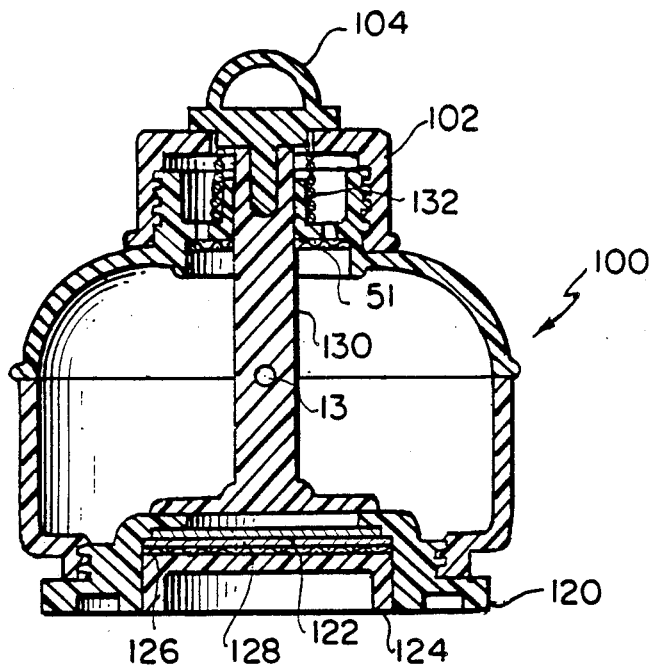
FIG. 2A is a sectional view of a preferred embodiment of the present invention shown in the "off" position.

FIG. 2A is a cross-sectional view of the chamber or housing shown in FIG. 1. The electret holder 120 is made of conducting plastic and is threadedly attached to the base of the container 100. An electret 122 is securely held in the electret holder 120 by plug 124. The electret 122 may be a disk of Teflon (TM E.I. DuPont) that has been given a permanent electrostatic charge. Plug 124 is held in place by friction against the electret holder 120 by use of a metal mesh 126 which backs against an aluminum foil 128 to provide electrical contact to the base of the electret. A plunger 130 is placed over the electret, spaced apart by the thickness of a shoulder portion 129 of the electret holder 120 and a small air gap (0.050"). The air gap is provided to present the plunger 130 from rubbing against the shoulder portion 129. The plunger 130 acts as a cover (keeper) to minimize the air volume adjacent the electret so that the electret is essentially "off" as a radon monitor when the plunger is in its lowered position.

Figure 2B:
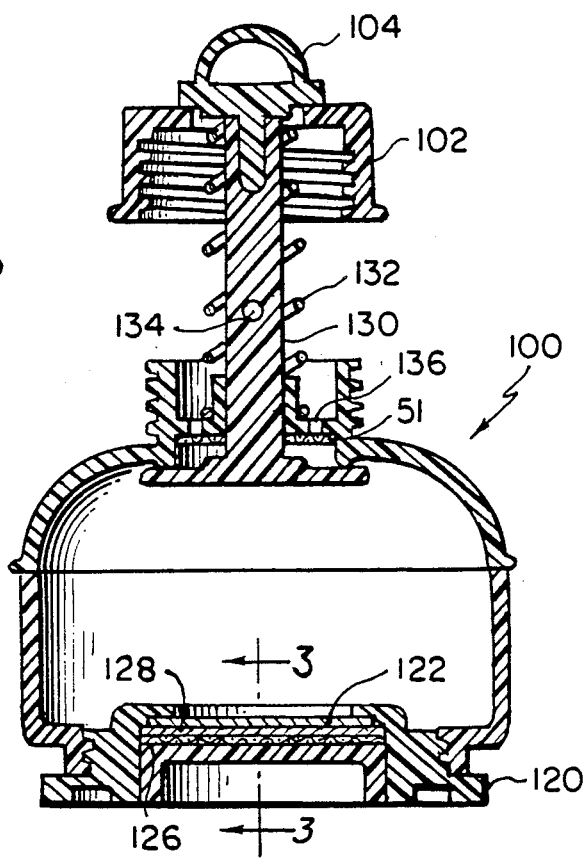
FIG. 2B is a sectional view of the invention in the "on" position.

The cap 102 is screwed onto the neck of housing 100 so that the cap holds the plunger 130 close to the electret holder when the cap is in place. As shown in FIG. 2B, upon threadedly removing the cap, spring 132 lifts the plunger 130 upward to its raised position. This retracts the plunger from the electret and the entire volume is open to the electret. The radon enters the chamber through the openings 136 in the neck of the housing 100. Filter 51 is shown covering the small holes in the neck of housing above the ionization chamber. A hole in the stem 134 can be pinned open to prevent accidental closure of the cap, therefore assuring an accurate reading over a specific period of time and preventing erroneous false low readings.

The ionization chamber as shown in FIGS. 1 and 2 provide a radon monitor that is simple and rugged to use. It is also economical because the electret can be read and used over again until its voltage reduces below a specified level. A typical useful range is from 750 volts down to 150 volts.

For use the electret holder can be removed from the housing and measured on a surface potential electret reader which is a special portable voltmeter. The initial or starting voltage is recorded. Once the radon monitor is in the location to be measured, the cap of the radon monitor is removed allowing the plunger 130 to move away from the electret and allow the air in the environment surrounding the monitor to diffuse into the ion chamber. After a known amount of time has elapsed, preferably after 2-7 days, the cap of the housing can be closed which lowers the plunger and effectively turns the electret off. A second reading is made of the surface potential on the electret to determine the voltage reduction over the time of the monitoring period. From this value the average radon concentration in the environment surrounding the monitor can be determined.

The holes 136 in the neck of the housing are designed to provide a restricted path and have a small area in relation to the volume of the housing so that most of the thoron which has a half life of less than one minute will decay prior to entry into the ionization chamber. Filter 5 removes any particles and ions from entering the housing and may be a Whitman No. 41 filter paper or equivalent. Therefore, the housing as disclosed does not need a membrane for the removal of thoron as previous radon monitors have proposed.

Figure 3:
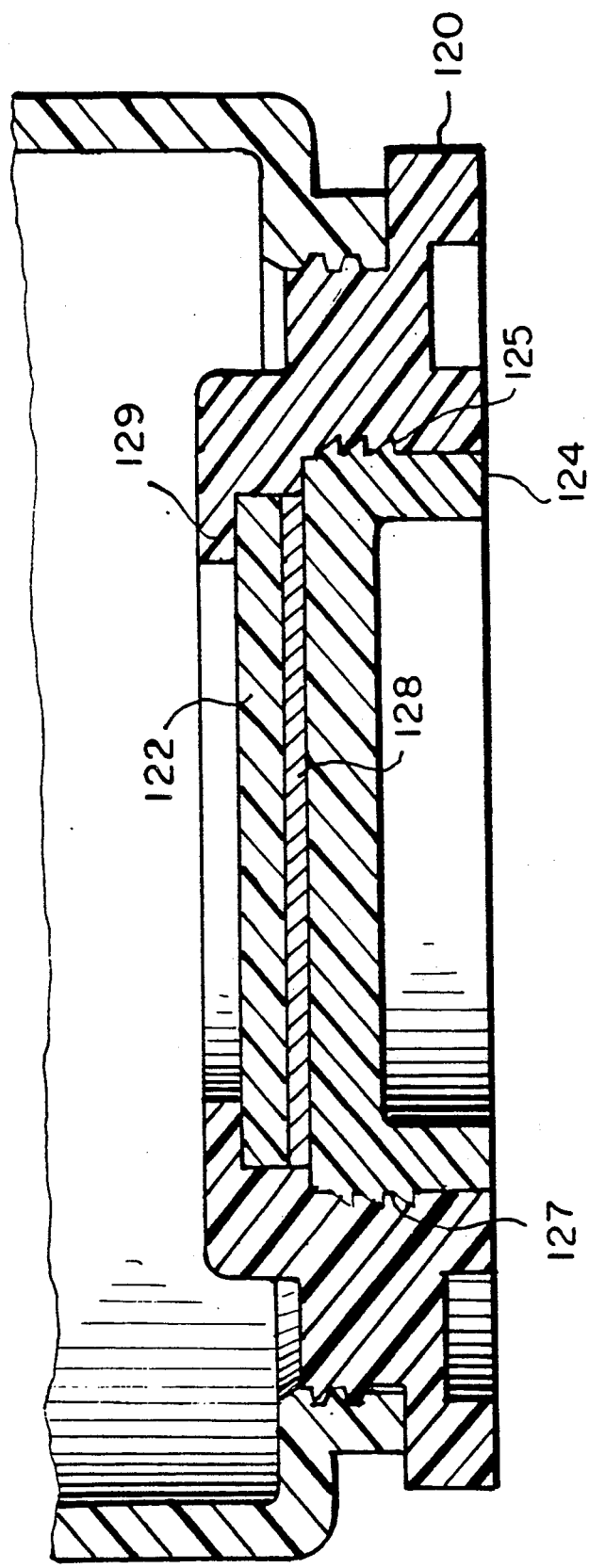
FIG. 3 is a partial sectional view showing in detail the electret holder.

Shown in FIG. 3 is a detailed drawing of the electret holder 120. In this instance plug 124 is made from a hard polycarbonate electrically conducting plastic. Plug 124 is held in place via barbs 125 which engages veniered grooves 127 in the electret holder 120. Electret 122 is held firmly against the shoulders 129 of the electret holder. In the previous example shown in FIGS. 2A and B, a wire mesh 126 was used in place of the barb design to hold the plugs in tight frictional contact with the electret holder. Aluminum foil 128 is used to provide good electrical contact between the back side of the electret and the conductor material of the electret holder.

One day exposure to a radon concentration of one picocurie per liter discharges the electret by about two volts for electret thickness of 1.5 mm. The electrets are also sensitive to background gamma radiation. At normal background radiation levels this discharges the electret at a rate equivalent to 0.8 picocuries per liter or less than two volts per day. This is subtracted from the computed radon concentration directly. A three day exposure in a dwelling with a radon concentration of three picocuries per liter reduces the electret surface potential about 23 volts. Therefore an electret with a useful range of about 600 volts may be used for many measurements.

To increase the sensitivity of the radon monitor a larger chamber or housing may be used. Shown in FIG. 4 is a spherical chamber 200 which is 12-15 centimeters in diameter. Electret holder 120 is threadedly attached to the spherical chamber. The chamber contains four holes, three of which are shown in 236 along the bottom of the spherical chamber so as not to be in direct line with the electric field emanating from the electret 122. A filter 238 covers each hole to prevent particles from entering the chamber. The design of FIG. 4 provides a prompt reading of radon concentration. Normally reading can be done in one day or less. The calibration factor for this device is in the neighborhood of 11 volts per picocurie per liter-day. The total volume of the sphere is on the order of one liter.

A long-term radon monitor designed for 1-2 year use in a given monitoring location is shown in FIG. 5. The design is of a hemispherical shape and comprises a spherical chamber 300 having an electret holder 120. One hole 336 is all that is required to provide the diffusion of environmental air into the housing. Filter 338 protects the interior of the chamber from particles. Filter 338 may be glued or otherwise attached in place. The total volume of the chamber is approximately 60 milliliters and is designed to be placed in a monitoring environment for approximately one year.

In the designs for the prompt (1 day) E-PERM (Electret-Passive Enviromental Radon Monitor) and for the extended long-term (1-2 years) E-PERM the keeper device has been left out to save cost. It is unnecessary to have such a keeper device when using the long-term device. For the short-term, device measurements need to be taken promptly to ensure accuracy of the device and the keeper is therefore not needed.

While the above provides disclosure of the invention along with preferred embodiments various modifications, alternative constructions and equivalents may be employed without departing from the spirit and scope of the invention. For example, various other shapes, electret thicknesses or sizes of housing configurations may be employed as desired. Keeper arrangements can also be incorporated in any of the devices. By incorporating larger entry areas, new devices can be made to respond to both radon and certain fraction of thoron. The response of the normal device can be substracted from the response of the new device to estimate the thoron concentration. The two devices have to be set side by side to achieve this.

What is claimed is:

1. A housing for an electret ion chamber radon monitor comprising:
   a chamber formed of electrically conductive plastic having an open bottom and a narrowed neck;
   electret means forming the bottom of the chamber containing an electret electrostatically charged to attract radioactive decay ions;

a cap attachable to the narrowed neck of the chamber, the cap having a vent hole for gas equalization of the chamber to the outside;

a keeper means attached to the cap so that when the cap is closed the keeper covers the electret and when the cap is opened the keeper is removed from the electret; and whereby opening and closing of the cap effectively turns on and off the radon monitor.

2. The housing of claim wherein the keeper means is a plunger rigidly attached to the cap; and wherein the cap is urged to an open position by a spring.

3. The housing of claim 2 wherein the plunger has a hole into which a pin may be inserted to prevent closure of the cap.

4. The housing of claim 1 wherein the cap has a looped shaped handle for hanging the radon detector in locations to be monitored for radon.

5. The housing of claim 1 wherein the electret means comprises:

an electrostatically charged Teflon disk; and an electret holder for receiving the electret disk and which is adapted to be threadedly attached to the bottom of the chamber, the electret holder having a shoulder above the electrical disk for contacting the keeper means thereby reducing the volume above the electret to near zero.

6. The electret means of claim 5 wherein the electret disk is held in place within the electret holder by a plug and wire mesh.

7. The electret means of claim 6 wherein the electret disk is held in place within the electret holder by a plug having a barb adapted to mate with grooves in the electret holder.

8. The electret of claim 7 wherein the plug is made of a hard conductive polycarbonate material.

9. The housing of claim 1 wherein filtered holes are formed in the neck of the housing and are of a proper size so as to minimize the entry of thoron.

10. The housing of claim 1 wherein by the proper choice of the filtered hole area, it is possible to estimate thoron concentration.

11. A housing for an electret ion chamber radon monitor comprising:

a generally spherical shaped chamber formed of an electrically conductive plastic having an open base region;

electret means adapted for mating with the base region, the electret means containing an electret electrostatically charged to attract radioactive decay ions; and inlet holes around the periphery of the base to allow exchange of ambient air by diffusion into the chamber.

12. The housing of claim 11 wherein the chamber is 12-15 centimeters in diameter and has a volume of approximately 1 liter.

13. The housing of claim 11 wherein the electret means comprises:

an electrostatically charged Teflon disk;

an electret holder for receiving the electret disk and which is adapted to be threadedly attached to the base region of the chamber; and the electret disk is held in place within the electret holder by a barbed plug made from a hard polycarbonate material engaging grooves in the electret holder.

14. The housing of claim 11 wherein the inlet holes are of the proper size so as to minimize the entry of thoron.

15. A housing for an electret ion chamber radon monitor comprising:

a generally hemispherical shaped chamber formed of an electrically conductive plastics having an open base region;

electret means adapted for mating with the base region, the electret means containing an electret electrostatically charged to attract radioactive decay ions; and an inlet hole located around the periphery of the hemispherical shaped chamber to allow exchange of ambient air by diffusion into the chamber.

16. The housing of claim 15 wherein the chamber has a volume of approximately 60 milliliters.

17. The housing of claim 15 wherein the electret means comprises:

an electrostatically charged Teflon disk;

an electret holder for receiving the electret disk and which is adapted to be threadedly attached to the base region of the chamber; and the electret disk is held in place within the electret holder by a barbed plug made from a hard polycarbonate material engaging grooves in the electret holder.

18. The housing of claim 15 wherein the inlet hole is of the proper size so as to minimize the entry of thoron.

* * * * *